United States Patent [19]

Siddiqui

[11] Patent Number: 5,278,221
[45] Date of Patent: Jan. 11, 1994

[54] POLYESTER FILM CONTAINING MINUTE GLASS SPHERES AND FUMED SILICA

[75] Inventor: Junaid A. Siddiqui, Richmond, Va.

[73] Assignee: ICI Americas Inc., Wilmington, Del.

[21] Appl. No.: 878,125

[22] Filed: May 4, 1992

Related U.S. Application Data

[60] Division of Ser. No. 632,241, Dec. 19, 1990, Pat. No. 5,132,356, which is a continuation-in-part of Ser. No. 613,183, Nov. 14, 1990, abandoned.

[51] Int. Cl.$^5$ ................................................ C08K 3/40
[52] U.S. Cl. .................................... 524/493; 524/494; 523/218; 523/219
[58] Field of Search ................. 524/493, 494; 523/218, 523/219

[56] References Cited

U.S. PATENT DOCUMENTS

| | | | |
|---|---|---|---|
| T952,010 | 11/1975 | Gregson | 523/219 |
| 3,230,184 | 1/1966 | Alford . | |
| 4,087,401 | 5/1978 | Stayner et al. | 523/219 |
| 4,274,025 | 6/1981 | Neruckar et al. . | |
| 4,293,479 | 10/1981 | Hanada et al. | 524/494 |
| 4,375,494 | 3/1983 | Stokes | 428/323 |
| 4,399,179 | 8/1983 | Minami et al. . | |
| 4,692,480 | 9/1987 | Takahashi et al. | 523/218 |
| 4,761,327 | 8/1988 | Hamano et al. . | |
| 4,798,759 | 1/1989 | Dallman et al. . | |
| 4,885,072 | 12/1989 | Harry et al. | 524/494 |
| 4,990,400 | 2/1991 | Endo et al. . | |

FOREIGN PATENT DOCUMENTS

1195948  7/1965  Fed. Rep. of Germany .

OTHER PUBLICATIONS

Derwent AN-87-209441, JP-62135874, Jun. 18, 1987.

*Primary Examiner*—Paul R. Michl
*Assistant Examiner*—Edward Cain
*Attorney, Agent, or Firm*—Paul L. Sharer

[57] ABSTRACT

The present invention relates to films or sheets of linear polyester containing glass spheres having a certain particle size distribution and in a certain amount based upon the weight of the polyester film. The addition of the glass spheres improves several properties of the film, including the dynamic coefficient of friction. Preferably, a second film additive, fumed silica, of a controlled particle size distribution and weight is additionally added to the film. The addition of the fumed silica additionally improves several properties of the polyester film, including the static coefficient of friction of the film.

4 Claims, No Drawings

POLYESTER FILM CONTAINING MINUTE GLASS SPHERES AND FUMED SILICA

This is a divisional of co-pending application Ser. No. 07/632,241 filed on Dec. 19, 1990 now U.S. Pat. No. 5,132,356 which is a continuation-in-part of application Ser. No. 07/613,183 filed on Nov. 14, 1990, now abandoned.

BACKGROUND OF THE INVENTION

Films or sheets of linear polyester have been commercially available for many years. The film has excellent draw orientation and has proved to be especially well suited for the biaxial film orientation process resulting in films of outstanding properties. The film is also known as polyethylene terephthalate or PET and is strong and has excellent inherent chemical and thermal stability properties. The polymer preparation and film manufacturing processes are well known to those skilled in the art and are recited in many texts, including the Encyclopedia of Polymer Science and Engineering, second edition, volume 12, by John Wiley and Sons, Inc., pages 1 through 313; and numerous U.S. and foreign patents.

The myriad uses of polyester film have resulted in the need for modification of the basic film to provide special properties such as improved slip and improved release properties. The control of surface slip is one of the prime requirements for the commercial use of polyester film. Slip is critical to the processability of the film, especially thin film. In the past, slip has been controlled by incorporating organic and inorganic filters to enhance surface roughness. However, the addition of these additives has caused increased haze in the film. These additives include inert particles such as silicas, china clay, aluminum silicates, calcium phosphates and glass particles. The addition of these fillers improves the winding and slitting properties of the polyester film, however, their presence in the film produces large surface asperities which makes polyester film unsuitable for demanding applications such as when the film is metallized with aluminum or gold and an absolutely smooth metallized surface is required. Examples of metallized films requiring a smooth surface are polyester films used for solar window applications or certain films demanding certain aesthetic properties.

U.S. Pat. No. 4,274,025 teaches a linear polyester film containing particles of inorganic material that has an improved resistance to fibrillation, delamination, and tearing. Included is a listing of the inorganic materials synthetic silica, calcium borate, calcium carbonate, zaagnesium carbonate, barium sulphate, calcium or aluminum silicate and glass beads. The particle size for the inorganic material is between 2 to 10 microns, but the amount of additive is stated to range between 2000 to 9000 parts per million (ppm) based upon the weight of the film. The patent teaches that adding less than 2000 ppm does not render the film surface sufficiently rough to promote a satisfactory sliding action for good slip or frictional purposes. Quite surprisingly, the linear polyester film of the present invention has excellent slip properties and it contains glass spheres in an amount 1000 times less than taught for U.S. 4, 274,025.

U.S. Pat. No. 4,375,494 teaches a polyester film composite of a highly crystalline, molecularly oriented first layer of linear polyester, a heat sealable second layer, adherent to the first layer, of an amorphous linear polyester. The second layer contains from 50 to 2000 ppm (based upon the weight of the second layer) of a finely-divided particulate additive having an average particle size in the range of 2 to 10 microns together with 1000 to 10,000 ppm (based upon the weight of the second film) of smaller, finely divided particles having an average particle in the range of 0.005 to 1.8 microns. Both particulate additives are substantially uniformly dispersed throughout the second layer. The particulate additive is stated to be natural or synthetic silica, glass beads, calcium borate, calcium carbonate, magnesium carbonate, barium sulphate, calcium silicate, calcium phosphate, aluminum trihydride, aluminum silicates and titanium oxide or certain polymeric materials. Ideally, the particles are substantially spherical in shape. The addition of the additives to the second layer results in a film having improved handling, heat sealing properties, and anti-blocking properties.

The amount of additives used in the film colaposite of this patent are much greater than the amount of additive material that has been found to be useful in the practice of the present invention.

SUMMARY OF THE INVENTION

The present invention relates to films or sheets of linear polyester containing glass spheres having a certain particle size distribution and in a certain amount based upon the weight of the polyester film. The addition of the glass spheres improves several properties of the film, including the dynamic coefficient of friction.

Preferably, a second additive, fumed silica, of a controlled particle size distribution and weight is additionally added to the film. The addition of the fumed silica additionally improves several properties of the polyester film, including the static coefficient of friction of the film.

DETAILED DESCRIPTION OF THE INVENTION one embodiment of the present invention relates to a film of a linear polyester containing minute glass spheres having an average particle size of about 2 to about 3 microns ($D_{50}=2-3$ microns) and a particle distribution as follows: 99.9% below about 8 microns ($\mu m$), 75% below about 5 microns, and 50% below about 2 microns. The glass spheres are present in an extremely small amount that ranges between about 1 part per million (ppm) to about 30 parts per million based upon the weight of the film; preferably the amount of glass spheres ranges between about 3 ppm to about 30 ppm and more preferably the amount ranges between about 6 ppm to about 20 ppm per weight of the film.

A film of linear polyester containing glass spheres of the above described particle distribution and weight will have improved handling properties, such as improved winding and slitting properties. As an improvement over prior art films of polyester having incorporated therein particles having similar particle size glass spheres but being present in very large amounts ranging from 0.2 to 0.9 percent by weight based upon the weight of the film, the film of the present invention does not have large surface asperities which render the film undesirable in certain applications such as where a smooth metallized film composite is required. For example, the film of polyester of the present invention when subsequently metallized film will be free of defects such as winding faults, blocking pimples, arrowheads or needles on the film surface.

Another embodiment of the present invention relates to a film of polyester containing the above described glass spheres in the particle size distribution and weight as described in the first embodiment and, in addition, containing as a second film additive agglomerated fumed silica particles having a particle size distribution of 100% below one micron with the average particle size range being between about 0.10 to about 0.50 microns and in an amount that ranges between about 0.01 to about 0.02 percent (%) by weight based upon the weight of the film. Preferably, the particle size distribution of the agglomerated fumed silica particles is loot below one micron with the average particle size ranging between about 0.20 to about 0.40 microns. Preferably, the amount of fumed silica that is present in the film ranges between about 0.015 to about 0.018% by weight based upon the weight of the film. Preferably, the particle size distribution of the aggolmerated fumed silica particles is 100% below one micron with the average particle size ranging between about 0.25 to about 0.35 microns. The individual or discrete fumed silica particles that go into the above described agglomerates of fumed silica particles generally have a particle size of around 0.05 microns. However, as discussed previously, fumed silica rarely exists as such small, discrete particles. Such small sized particles usually exist as agglomerates of 2 or more discrete particles.

Film of polyester having both the glass sphere and fumed silica additives will have a refractive index that is very close to the refractive index of biaxially oriented polyester film containing no additives. Such film is very, very clear and thus it has a minimum amount of haze. Also, the addition of the fumed silica in the particle size distribution and amount described above results in a film having an improved static coefficient of friction.

The glass spheres that are useful in the practice of the invention are commercially sold and have a particle size distribution as measured by conventional apparatus such as a Malvern particle size analyzer. The glass spheres are a solid glass sphere and are not limited to any chemical composition and they can have either a smooth surface or an etched surface. The surface can be etched by contacting the glass spheres with nitric acid for a time sufficient to give the desired degree of etching of the surface. The glass spheres having the etched surface are preferred. The glass spheres are substantially spherical in shape with the particle size in microns referring to the diameter of the glass spheres. Preferred glass spheres are sold under the trade name Spheriglass ® and are sold by Potters Industries Inc., an affiliate of the PQ Corporation.

Fumed silica is formed when silicone tetrachloride reacts in a hydrogen flame to form single, spherical droplets of silicone dioxide. These grow through collision and coalescence to form larger droplets. As the droplets cool and begin to freeze, but continue to collide, they stick but do not coalesce, forming solid aggregates which in turn continue to collide to form clusters which are known as agglomerates. The particle size for the fumed silica refers to the particle size of a single cooled spherical droplet.

The required quantities of glass spheres and fumed silica can be added to the film of polyester forming material at any point in the film manufacturing process prior to the extrusion of the polymer. In the general practice of this invention, it is preferred to incorporate the glass spheres and fumed silica particles into the polyester during its production by polymerization. A convenient procedure is to add the particles to the polycondensation mixture used for the production of the polyester. It has been found particularly desirable to add the glass spheres and fumed silica during the manufacture of the polyester polymer as a slurry after the ester interchange reaction in which monomers are formed. The particles can, for example, be added as a slurry in the glycol from which the polyester is formed prior to the commencement of the polycondensation.

The polymer useful in the manufacture of a film of a synthetic linear polyester is well known to those skilled in the art and may be obtained by condensing one or more dicarboxylic acids or their lower alkyl (up to 6 carbon atoms) diesters, eg. terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydroterephthalic acid or 1,2-bis-p-carboxyphenoxyethane (optionally with a monocarboxylic acid, such as pivalic acid) with one or more glycols, eg. ethylene glycol, 1,3-propanediol, 1,4-butanediol, neopentyl glycol and 1,4-cyclohexanedimethanol.

The polyester film prepared from the composition according to the present invention may be uniaxially or biaxially oriented, but is preferably biaxially oriented by drawing in two mutually perpendicular directions in the plane of the film to achieve a satisfactory combination of mechanical and physical properties. Preferably, the film is biaxially oriented by sequential stretching in two mutually perpendicular directions, typically at a temperature in the range of 70° to 250° C. Such stretching is described in many patents, including British Patent No. 838,708. These techniques are well known to those skilled in the polyester film manufacture art.

A conventional coating medium may optionally be applied to the polyester film. Such coatings are customarily added to improve the adhesive or anti-static properties. The chemical compositions of these coatings are well known to those skilled in the art and are described in numerous patents and publications. The coating medium may be applied to an uniaxially oriented or a biaxially oriented film substrate. In a simultaneous biaxially oriented stretching process, the coating medium is suitably applied to the substrate either before commencement or after conclusion of the stretching operation. In a sequential biaxially oriented stretching process, preferably the coating medium is applied to the film substrate between the two stretching stages i.e. between the longitudinal and transverse stretchings of a biaxial stretching operation. Such a sequence of stretching and coating is especially preferred for the production of a coated polyethylene terephthalate film. Preferably the film is first stretched in the longitudinal direction over a series of rotating rollers, then coated with the coating medium, and lastly stretched transversely in a stenter oven, preferably followed by heat setting of the coated film.

The optional coating medium may be applied to the polyester film as an aqueous dispersion or solution in an organic solvent by any suitable conventional coating technique such as by dip coating, bead coating, reverse roller coating or slot coating.

The temperatures applied to the coated film during the subsequent stretching and/or heat setting are effective in drying the aqueous medium, or the solvent in the case of solvent-applied compositions, and also in coalescing and forming the coating into a continuous and uniform layer.

A preferred adhesion coating or layer for the polyester film according to the invention is manufactured from film-forming adhesion layer polymers providing superior adhesion properties. Suitable adhesion layer polymers comprise at least one monomer derived from an ester of acrylic acid, especially an alkyl ester where the alkyl group contains up to ten carbon atoms such as methyl, ethyl, n-propyl, isopropyl, n-butyl, isobutyl, terbutyl, hexyl, 2-ethylhexyl, heptyl, and n-octyl. Polymers derived from an alkyl acrylate, for example ethyl acrylate and butyl acrylate, together with an alkyl methacrylate are preferred. Polymers comprising ethyl acrylate and methyl methacrylate are particularly preferred. The acrylate monomer is preferably present in a proportion in the range of 30 to 65 mole %, and the raethacrylate monomer is preferably present in a proportion in the range of 20 to 60 mole %.

Other monomers which are suitable for use in the preparation of the adhesion layer polymer, which may be preferably copolymerized as optional additional monomers together with esters of acrylic acid and/or methacrylic acid, and derivatives thereof, include acrylonitrile, methacrylonitrile, halo-substituted acrylonitrile, halo-substituted methacrylonitrile, acrylamide, methacrylamide, N-methylol acrylamide, N-ethanol acrylamide, N-propanol acrylamide, N-nethacrylamide, N-ethanol methacrylamide, N-methyl acrylamide, N-tertiary butyl acrylamide, hydroxyethyl methacrylate, glycidyl acrylate, glycidyl methacrylate, dimethylamino ethyl methacrylate, itaconic acid, itaconic anhydride and half esters of itaconic acid.

Other optional monomers of the adhesion layer polymer include vinyl esters such as vinyl acetate, vinyl chloracetate and vinyl benzoate, vinyl pyridine, vinyl chloride, vinylidene chloride, maleic acid, maleic anhydride, styrene and derivatives of styrene such as chloro styrene, hydroxy styrene and alkylated styrenes, wherein the alkyl group contains from one to ten carbon atoms.

A preferred adhesion layer polymer is derived from 3 monomers: (1) 35 to 60 mole % ethyl acrylate, (2) 30 to 55 mole % methyl methacrylate, and (3) 2 to 20 mole % methacrylamide.

The molecular weight of the adhesion layer polymer can vary over a wide range, but is preferably within the range 40,000 to 300,000, and more preferably within the range 50,000 to 200,000.

If desired, the optional coating composition may also contain a cross-linking agent which functions to form cross-links within the coating layer thereby improving adhesion to the polymeric film substrate. Additionally, the cross-linking agent should preferably be capable of internal cross-linking in order to provide protection against solvent penetration. The cross-linking of cross-linkable coating compositions can be achieved at the conventional stretching and/or heat-setting temperatures. Suitable cross-linking agents may comprise epoxy resins, alkyd resins, amine derivatives such as hexamethoxymethyl melamine, and/or condensation products of an amine, eg. melamine, diazine, urea, cyclic ethylene urea, cyclic propylene urea, thiourea, cyclic ethylene thiourea, alkyl melamines, aryl melamines, benzo guanamines, guanamines, alkyl guanamines and aryl guanamines, with an aldehyde, eg. formaldehyde. A useful condensation product is that of raelamine with formaldehyde.

The condensation product may optionally be alkoxylated. The cross-linking agent may be used in amounts of up to 25% by weight based on the weight of the polymer in the optional coating composition. A catalyst is also preferably employed to facilitate cross-linking action of the cross-linking agent. Preferred catalysts for cross-linking melamine formaldehyde include ammonium chloride, ammonium nitrate, ammonium thiocyanate, ammonium dihydrogen phosphate, ammonium sulphate, diammonium hydrogen phosphate, para toluene sulphonic acid, maleic acid stabilized by reaction with a base, and morpholinium para toluene sulphonate.

Preferably, the uncoated polyester film of this invention is manufactured so that it has a thickness of about 98 to 500 gauge.

The coating layer is preferably applied to the polyester film at a coat weight within the range 0.1 to 10 $mgdm^{-2}$, especially 0.5 to 2.0 $Mgdm^{-2}$.

The ratio of the thickness of the polyester substrate to the thickness of the coating layer can vary within a wide range, although the thickness of the coating layer preferably should not be less than 0.004% nor greater than 10% of that of the substrate. In practice, the thickness of the coating layer is desirably at least 0.01 micron and preferably should not exceed about 1.0 micron.

Prior to deposition of the coating layer onto the polyester substrate, the exposed surface thereof may, if desired, be subjected to a chemical or physical surface-modifying treatment to improve the bond between that surface and the subsequently applied coating layer. Modification of the substrate surface may for example be by flame treatment, ion bombardment, electron beam treatment or ultra-violet light treatment. A preferred treatment, because of its simplicity and effectiveness is to subject the exposed surface of the substrate to a high voltage electrical stress accompanied by corona discharge. Alternatively, the substrate may be pretreated with an agent known in the art to have a solvent or swelling action on the substrate polymer. Examples of such agents, which are particularly suitable for the treatment of a polyester substrate, include a halogenated phenol dissolved in a common organic solvent eg. a solution of p-chloro-m-cresol, 2,4-dichlorophenol, 2,4,5- or 2,4,6-trichlorophenol or 4-chlororesorcinol in acetone or methanol.

The optional coating layer may be applied to one or both surfaces of the polyester substrate, and one or both coating layers may be subjected to coating with additional material. The function of the original coating layer may thus be as a primer layer to aid the subsequent deposition of additional coating layer(s).

The one or more polymeric layers of the polyester film substrate and any optional coating layers used to form a composition may conveniently contain any of the additives conventionally employed in the manufacture of thermoplastics polyester films. Thus, such agents as dyes, pigments, voiding agents, lubricants, anti-oxidants, anti-blocking agents, surface active agents, slip aids, gloss-improvers, prodegradants, ultra-violet light stabilizers, viscosity modifiers and dispersion stabilizers may be incorporated in the polyester film substrate and/or coating layer(s), as appropriate.

The invention can be better Understood by referring to the following specific examples which teach the several embodiments of this invention.

EXAMPLE 1

Commercially solid glass spheres, sold by Potters Industries Inc. as SPHERIGLASS® E25OP2BH having a particle size distribution of 99.9 percent below 7.2 microns, 75 percent below 5 microns and 50 percent below 2.0 microns and an average particle size of 2.2 microns ($D_{50}$=2.2 microns) were mixed with ethylene glycol to form a slurry having a 1.0% solid. The slurry was mixed under high shear in a 5 gallon Ross Mixer for one hour. The mixed slurry was pumped into the bishydroxyethylene terephthalate (monomer) that is used in the commercial preparation of polyethylene terephthalate. The glass spheres were added in quantities such that 6 ppm were found in the resulting extruded film. After the addition of glass spheres, conventional polymerization catalysts were added to the reaction mixture. The resulting PET polymer was extruded onto a cooled quenched surface and biaxially oriented by conventional film manufacturing techniques. The molten monomer was then polymerized at 2850-2900C. at a pressure of about 0.5 millimeters of mercury. The resulting polyethylene terephthalate was cooled and converted to chips.

The dried chips were then extruded at 285° C. into film and then biaxially oriented by stretching in sequence in mutually perpendicular directions at draw directions of about 2.9:1 in each direction followed by heat setting at 225° C. The resulting filled film product had a total thickness of 200 gauge and was evaluated for optical properties as compared to an identical unfilled 200 gauge film made of the same polyester polymer and manufactured by the same procedure. Both films had an extremely low bulk haze of 0.25% as measured by the Gardner Hazemeter. In addition to excellent clarity, the filled polyester film had excellent gloss. The filled film was also evaluated for winding characteristics and found to produce smooth mill rolls at high winding speeds with no observable interfacial sticking surface blemishes such as arrowheads, blocking pimples, needles, or telescoping. The filled film was metallized with aluminum using conventional techniques and the aluminum surface was found to have no speckles.

EXAMPLE 2

A second filled biaxially oriented polyethylene terephthalate (polyester) film was prepared by the procedures of Example 1 but varied by incorporating 6 ppm of the glass spheres used in Example 1 and 165 ppm fumed silica, Aerosile® OX50 sold by the DeGussa Company. The fumed silica had a discrete particle size of 0.050 microns. Ethylene glycol slurries of the fumed silica and the glass spheres were prepared in a Ross high speed mixer at concentrations of 4% and 1% solids, respectively. The slurries were added to the molten monomer. The molten monomer was then polymerized at 285°-290° C. at a pressure of about 0.5 millimeters of mercury. The resulting polyethylene terephthalate was cooled and converted to chips.

The dried chips were then extruded at 285° C. into film and then biaxially oriented by stretching in sequence in mutually perpendicular directions at draw directions of about 2.9:1 in each direction followed by heat setting at 225° C having a thickness of 200 gauge. The film was evaluated for winding and optical characteristics and was found to exhibit excellent optical and winding performance. Compared to the unfilled film prepared in Example 1, there was a slight depreciation in film clarity (0.3% for .200 gauge film versus 0.25% in Example 1) but still the clarity was excellent.

EXAMPLE 3

Another filled biaxially oriented polyethylene terephthalate (polyester) film was prepared by incorporating 3 ppm of the glass spheres used in Example 1 and 83 ppm of the fumed silica used in Example 2. Ethylene glycol slurries of the fumed silica and the glass sphere were prepared in a Ross high speed mixer at concentrations of 4% and 1% solids, respectively. The slurries were added to the molten monomer. The molten monomer was then polymerized at 285°-290° C. at a pressure of about 0.5 millimeters of mercury. The resulting polyethylene terephthalate was cooled and converted to chips.

The dried chips were then extruded at 285° C. into film and then biaxially oriented by stretching in sequence in mutually perpendicular directions at draw directions of about 2.9:1 in each direction followed by heat setting at 225° C. having a thickness of 200 gauge. The film was evaluated for winding and optical characteristics and was found to exhibit excellent optical and winding performance. Compared to the unfilled film prepared in Example 1, the clarity was almost identical and good winding characteristics were obtained.

EXAMPLE 4

Example 3 was repeated except that 6 ppm of commercially solid glass spheres, sold by Potters Industries Inc. as SPHERIGLASS® E25OP2BH and 165 ppm of Cab-o-sil L90 (primary particle size 27nm, and average agglomerate size =220 to 250nm) sold by Cabot Corporation were used as the filler. Again, film was obtained that had excellent optical clarity and good winding characteristics. No "speckle" was observed after metallizing the film with aluminum and also with gold.

EXAMPLE 5

Films produced in Examples 1 through 3 were coated on one side with a conventional antistatic coating composition. Films were obtained with excellent clarity, good winding and antistatic properties. No "speckle" was observed after metallizing the uncoated side of the film with aluminum and also with gold.

EXAMPLE 6

Films produced in Examples 1 through 3 were coated on one side with a conventional adhesion promoting coating. Films were obtained that had good clarity, good winding and good adhesion properties. No "speckle" was observed after metallizing the film on the uncoated side with aluminum and also with gold.

I claim

1. A film of a linear, oriented, and heat set polyester containing glass spheres having an average particle size of about 2 to about 3 microns and a particle distribution of 99.9 percent below about 8 microns, 75 percent below about 5 microns and 50 percent below about 2 microns in an amount that ranges between about 1 part per million to about 30 parts per million based upon the weight of the film of linear polyester.

2. The film of linear polyester of claim 1 wherein the range of the glass spheres if between about 3 parts per million and about 30 parts per million.

3. The film of linear polyester of claim 1, wherein the weight range of the glass spheres is between about 6 parts per million and about 20 parts per million.

4. The film of claim 3 wherein the film is of a thickness of about 48 gauge to about 500 gauge and the glass spheres have an etched surface.

* * * * *